Patented June 16, 1931

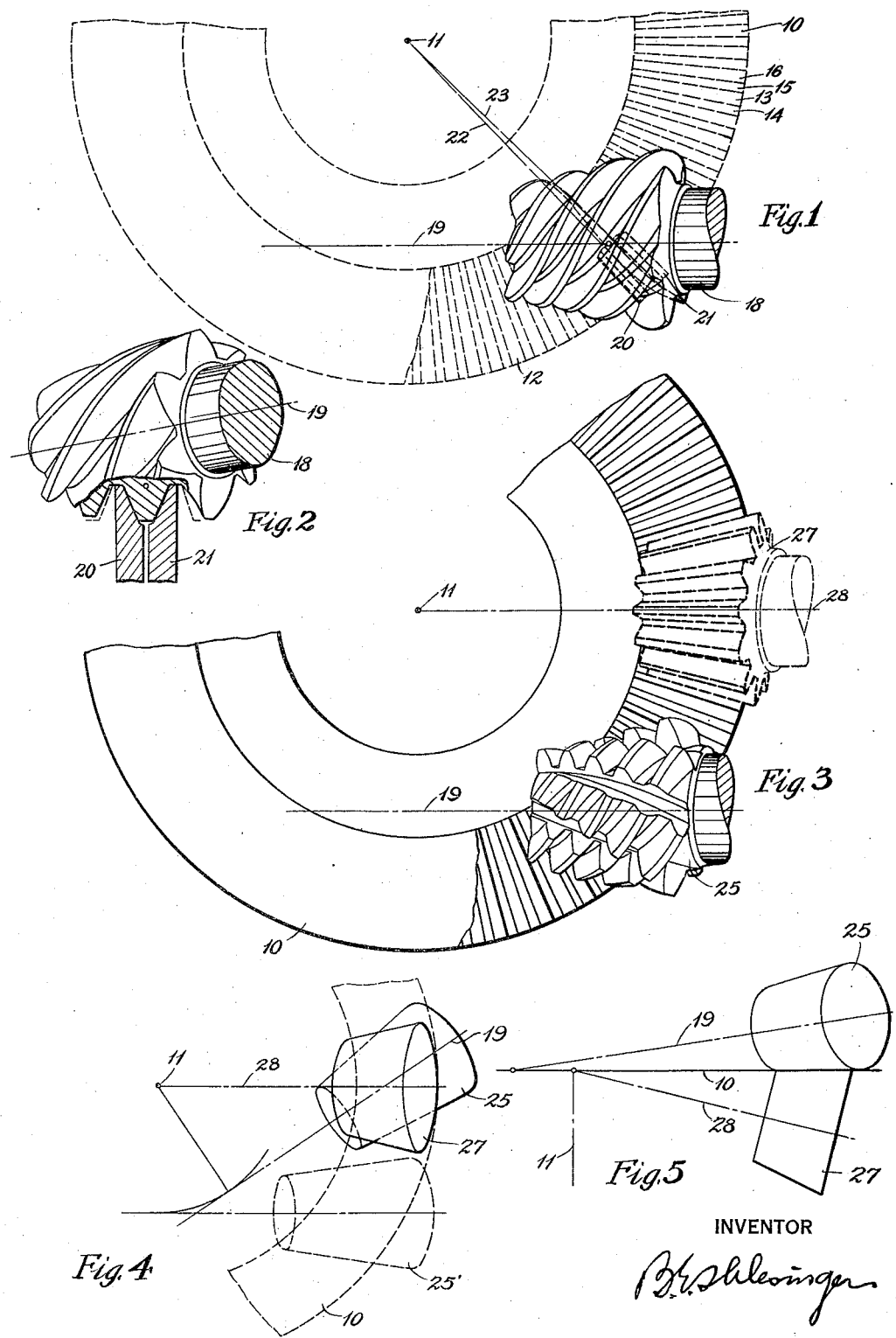

1,809,948

UNITED STATES PATENT OFFICE

BERNARD EDWARD SHLESINGER, OF IRONDEQUOIT, NEW YORK, ASSIGNOR TO GLEASON WORKS, OF ROCHESTER, NEW YORK, A CORPORATION OF NEW YORK

METHOD OF PRODUCING GEARS

Application filed December 15, 1927. Serial No. 240,226.

The present invention relates to the hobbing of gears and in particular to the hobbing of tapered gears conjugate to a straight tooth basic gear. In a more particular aspect, the present invention relates to the hobbing or cutting in a continuous operation of straight tooth bevel gears. This invention includes a method of hobbing gears, a hob for producing gears and a method of manufacturing this hob. The present application is restricted to the method of hobbing gears.

With the hobbing method of the present invention, gears having teeth on their side faces, such as bevel, hypoid and crown gears, may be provided with straight teeth or with teeth conjugate to those of a straight tooth basic gear in a continuous indexing or cutting process. The gears may be produced in a rolling or generating operation or may be cut simply by the continuous intermeshing action of hob and blank without roll. The present invention, provides, for the first time, a correct method of hobbing straight toothed tapered gears.

With this invention, a hob is employed which is formed from a worm which will mesh with the gear to be cut or with a basic straight tooth gear along a line offset from the gear apex and extending diagonally of the face of the gear and this hob is positioned in engagement with the blank with its axis offset from the axis of the blank or basic gear and extending diagonally of the face of the blank or basic gear, as the case may be, and is then rotated in continuous intermeshing engagement with the blank which is rotated continuously on its axis. If the tooth profiles are to be generated, an additional relative rolling or generating motion will be imparted simultaneously between hob and blank. Thus, in generating a straight tooth bevel gear according to this invention, a worm hob may be employed which is capable of meshing with a straight tooth basic crown gear when it extends diagonally of the face of the crown gear and is offset from its axis. The bevel gear blank to be cut will then be positioned, as usual, with its axis intersecting the axis of the imaginary crown gear and the hob will be so adjusted that its axis extends diagonally of the face of the imaginary crown gear and is offset from the axis of the crown gear the correct distance. The hob and blank are then rotated in continuous intermeshing timed relation while simultaneously a relative rolling or generating movement is produced between the hob and blank as though the blank were meshing with the basic crown gear.

The present invention is illustrated in one application in the accompanying drawings, in which:

Figure 1 is a diagrammatic view illustrating the method of producing a worm conjugate to a straight tooth crown gear;

Figure 2 is a section on the line 2—2 of Figure 1;

Figure 3 is a view showing a hob formed by gashing and relieving the worm and illustrating, also, the relationship between this hob, the crown gear, and the straight tooth bevel gear which may be generated with this hob; and Figures 4 and 5 are a diagrammatic plan view and side elevation, respectively, illustrating the method of generating in a hobbing operation a straight tooth bevel gear according to this invention.

The present invention has for its basis the discovery that a worm can be produced conjugate to a straight toothed tapered gear (the term "tapered", as employed in this specification, including in its scope a true crown gear, namely, a gear having a pitch cone angle of 90°). This, in turn, is based upon the broader discovery that a worm can be produced conjugate to any tapered gear by positioning the worm blank so that its axis is offset from the axis of the tapered gear and extends diagonally of the face of such gear and by causing a tool to trace the teeth of the tapered gear while producing a relative movement between the tool and worm blank as though the worm blank were meshing with said tapered gear.

Figures 1 and 2 illustrate the method of producing according to this invention a tapered worm conjugate to a straight toothed crown gear. The crown gear is illustrated in dotted lines at 10. Its apex or center is at 11 and it is provided with straight radial teeth 12 having tips 13, and sides 14 and 15. The grooves between the teeth are indicated at 16. For producing the tapered worm 18, the worm blank is positioned as though its axis 19 were offset from the axis or apex of the crown gear indicated at 11 and as though its axis extended, as shown, diagonally across the face of the crown gear. In the cutting, a pair of reciprocating tools are preferably employed, these tools, as shown in Figure 2, will have straight profiled cutting edges conforming to the tooth profile of the crown gear although it is to be understood that if the crown gear was of curved profile, the tools would be of correspondingly curved profile. The tools 20 and 21 are reciprocated in converging paths as indicated by the dotted lines 22 and 23 to cause the tools to trace tooth surfaces of the crown gear 10. Simultaneously the worm blank is rotated on its axis 19 and a relative movement is imparted between the tools 20 and 21 and the blank 18 about the axis 11 of the crown gear 10. In this relative movement, for each revolution of the worm blank on its axis, 19, the tools are swung relatively to the blank about the axis 11 of the crown gear through a distance equal to the pitch of the crown gear or a multiple thereof, depending upon whether the worm to be cut is a single threaded or a multiple threaded worm.

After the tools have thus cut a thread on the worm blank for its entire length, they may be returned to original position and fed relatively to the blank to cause the tools to cut deeper into the blank in the ensuing operation. The cutting feed movements will be continued until the threads have been cut to the desired depth upon the blank. It will be understood, of course, instead of an intermittent feed a continuous feed may be employed.

The worm produced in this manner will be truly conjugate to the crown gear 10 and capable of correctly representing this crown gear in a generating operation for hobbing straight tooth bevel gears. To this end, the worm 18 will be gashed and relieved to form a hob as illustrated at 25 in Figure 3.

When the hob 25 is placed so that its axis extends diagonally of the face of the crown gear 10 and is offset from the apex or axis 11 of said crown gear by the same amount as the axis of the worm 18 was offset from the axis of the crown gear 10 during manufacture, namely, when the hob 25 occupies the same position relative to the crown gear 10 as did the worm 18 during manufacture, the hob 25 can be used to represent the crown gear 10 and be employed in a generating operation to hob a straight tooth bevel gear, such as indicated in dotted lines at 27 in Figure 3 which will be conjugate to the crown gear 10.

Figures 4 and 5 show one method of generating with a hob such as illustrated at 25 a straight tooth bevel gear such as shown at 27.

The hob 25 is positioned so that its axis 19 is offset from the axis or apex 11 of the crown gear 10 as above described. The blank 27 is so positioned that its axis 28 intersects the axis 11 of the crown gear in the crown gear apex. The hob 25 is then rotated on its axis in engagement with the blank 27 which is rotated continuously on its axis and simultaneously a relative rolling or generating movement is produced between the hob and blank as though the blank were meshing with crown gear 10. In this relative movement the blank may be given an additional generating rotation about its axis and the hob, as illustrated, swung about the axis 11 of the crown gear at their proper ratio.

It will be understood, of course, that instead, the generating motion might be imparted wholly to the blank or wholly to the hob. In the drawings, the dotted line position 25' indicates the position of the hob at the beginning of the roll and the heavy line position 25 the position of the hob in the middle of the roll. With the present invention, all the teeth of said bevel gear 27 will be cut simultaneously and will be completed in one relative roll of the hob across the blank.

The bevel gear 27 produced in the manner described according to this invention will have teeth of the same conformation as straight tooth bevel gears generated according to processes heretofore employed. A mating straight tooth bevel gear may be cut in a similar manner and two gears so hobbed can be meshed, as are bevel gears cut according to previously known processes, with their axes intersecting in a common apex.

To produce a gear which will be theoretically conjugate to a basic gear according to this invention, the hob should occupy the same position relative to the imaginary basic gear during cutting as the worm from which the hob was produced occupied to that basic gear during the manufacture of the worm. It will be understood, however, that for various reasons, as for instance, for the sake of localizing the bearing, it may be desirable that one or both hobs employed in cutting the two members of the pair of bevel gears or other tapered gears according to this invention be positioned slightly away from the theoretically correct position. It will be understood, of course, that the position that the worm will occupy relative to the imaginary basic gear, during manufacture, will be governed by such factors as the spiral angle of the worm thread to be produced, tool clearance, character of cutting action etc., and that within these limits, the worm blank may be positioned in any desired relationship to the basic gear during its manufacture.

In the drawings, the worm is shown as manufactured by the cutting action of a pair of tools 20 and 21 which in their movement trace the teeth of the basic crown gear 10. It will be understood, however, that instead of using a pair of reciprocating tools for cutting the worm, a tool might be employed having the structure of the crown gear and having its teeth gashed and relieved in a suitable manner to form cutting edges. In other words, the crown gear itself might be employed as a cutting tool for manufacturing the worm by gashing the teeth of the crown gear and relieving these teeth back of the gashes. In event such a tool were employed, the worm would be positioned relative to it as already described and the worm blank and tool rotated on their respective axes at a rate such that the worm blank would make one revolution during rotation of the tools about its axis through an angle corresponding to one or a plurality of pitches of the crown gear.

While a tapered worm and hob are shown, it will be understood that the present invention may be practised, also, with a cylindrical worm and hob.

In present day practise in cutting bevel gears, it is usual to generate the gears conjugate to a nominal crown gear, that is, a gear having a plain top surface and a pitch cone angle of less than 90°. It is apparent that the present invention may be employed in producing bevel gears conjugate to such a crown gear, by causing the tools employed to cut the worm to represent such a crown gear and by positioning the worm and hob as to represent such a crown gear. With the present invention, also, such known principles regarding the cutting of bevel gears, as the positioning of the blank with its apex offset from the crown gear apex to produce a localized bearing, may be practised.

While the present invention has been illustrated in connection with the production of bevel gears having straight radial teeth, it will be understood that this invention is applicable, also, to the manufacture of bevel gears having skew or non-radial teeth. In this case, the tools, such as 20 and 21 employed in manufacturing the worm will be moved in a skew or non-radial path with reference to the apex of the crown gear so as to trace the teeth of the crown gear or the skew crown gear may itself be employed as a cutter by suitably gashing its teeth. The worm blank will be positioned diagonally of the crown gear and in such offset relation as to secure a desirable cutting action during the manufacture of the worm and during the generation of the gears.

While the present invention has been described in connection with the generation of gears conjugate to a basic crown gear, it will be understood that hobs may be produced according to this invention, also, for generating gears conjugate to a mate non-generated gear. In this case, the cutting tools or tool for producing the worm will represent the mate gear. In fact, a hob can be produced according to this invention for cutting a straight tooth gear without roll, such a hob being produced from a worm which is cut conjugate to a straight tooth tapered gear by positioning the worm with its axis extending diagonally of the face of the gear and offset from its axis and by causing the tools to represent the sides bounding the tooth spaces of the gear.

The present invention may be employed, also, in generating hypoid gears conjugate to an offset crown gear or to an offset mating gear. In this case, the hob will be produced from a worm which is manufactured conjugate to a crown gear or mating gear in the manner already described and this hob will be positioned to represent the crown gear or mating gear in a generating operation in which the axis of the blank is maintained offset from the axis of the crown gear or mating gear, according to the usual method of cutting hypoid gears.

The basic principles underlying the present invention are not restricted to the cutting of straight tooth gears or the cutting of gears conjugate to straight tooth basic gears. Thus a spiral bevel gear or a spiral hypoid gear may be cut with this invention of the same conformation as spiral bevel or hypoid gears cut with a face mill according to known methods. This can be accomplished by positioning the worm from which the hob is to be produced with its axis extending diagonally of the face of the crown gear and offset from the crown gear axis and by employing a face mill of the usual type, positioning this face mill to represent a tooth surface of the basic gear rotating the face mill in engagement with the worm blank while rotating the worm blank on its axis and simultaneously producing a relative movement between the face mill and worm blank about the axis of the basic gear during which the worm blank makes one revolution for an angular movement about the axis of the basic gear of one pitch or of a plurality of pitches, depending upon the number of threads to be cut in the worm blank. The spiral bevel gear or spiral hypoid gear can then be cut with such a hob by positioning the hob to represent the basic gear and rotating the hob in engagement with the blank while rotating the blank continuously on its axis and producing the required generating movement between the hob and blank. Worms can be produced conjugate to other forms of basic gears according to the principles already set forth and from these worms hobs can be produced which may be employed to generate gears conjugate to such basic gears.

It is to be understood that the present invention is capable of various further modifications and uses within its limits and the scope of the following claims, and that this application is intended to cover any adaptations, uses, or embodiments of my invention, following in general, the principles of this invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. The method of generating a tapered gear conjugate to a straight tooth basic gear, which consists in employing as a tool, a worm hob capable of meshing with said basic gear along a line offset from the axis of said basic gear and extending diagonally of the face thereof, and positioning said hob with its axis extending diagonally of the face of a tapered gear blank, rotating said hob in engagement with the blank while rotating the blank on its axis continuously and simultaneously producing a relative generating movement between the hob and blank corresponding to that of a gear meshing with said basic gear.

2. The method of generating a straight tooth bevel gear conjugate to a straight tooth basic gear which consists in employing a hob which is conjugate to said basic gear, positioning said hob with its axis offset from the axis of a tapered gear blank and extending diagonally of the face thereof and rotating said hob in engagement with the blank while rotating the blank on its axis continuously and simultaneously producing a relative rolling movement between the hob and blank about an axis intersecting the axis of the blank as though the blank were meshing with said basic gear.

3. The method of generating a straight tooth bevel gear conjugate to a straight tooth basic crown gear, which consists in employing a hob formed by gashing and relieving a worm which will mesh with said basic crown gear along a line offset from the axis of said crown gear and extending diagonally of the face thereof, positioning said hob with its axis offset from and extending diagonally of the face of a tapered gear blank and rotating said hob in engagement with the blank while rotating the blank on its axis continuously and simultaneously producing a relative rolling motion between the hob and blank corresponding to that of a bevel gear meshing with said basic crown gear.

4. The method of generating a tapered gear conjugate to a straight toothed basic gear which consists in employing a taper hob conjugate to said basic gear, positioning said hob with its axis extending diagonally across the face of a tapered gear blank and rotating said hob in engagement with the blank while rotating the blank on its axis continuously and simultaneously producing a relative generating movement between the hob and blank corresponding to that of a gear meshing with said basic gear.

5. The method of generating a straight tooth bevel gear conjugate to a straight tooth basic gear which consists in employing as a tool, a taper hob formed by gashing and relieving a taper worm capable of meshing with said basic gear along a line offset from the axis of said basic gear and extending diagonally of the face thereof, positioning said taper hob with its axis offset from and extending diagonally of the face of a tapered gear blank and rotating said hob in engagement with the blank while rotating the blank on its axis continuously and simultaneously producing a relative generating movement between the hob and blank about an axis intersecting the axis of the blank.

6. The method of generating a straight tooth bevel gear conjugate to a straight tooth basic crown gear which consists in employing as a tool, a taper hob formed by gashing and relieving a taper worm which will mesh with said basic crown gear along a line offset from the axis of the crown gear and extending diagonally of the face thereof, positioning said hob with its axis offset from the axis of the blank and extending diagonally of the face thereof, and rotating said hob in engagement with the blank while rotating the blank on its axis continuously and simultaneously producing a relative rolling movement between said hob and blank corresponding to that of a bevel gear meshing with said basic crown gear.

7. The method of generating a tapered gear conjugate to a straight tooth basic gear which consists in selecting a hob which will mesh with said basic gear along a line extending diagonally of the face of said basic gear, positioning said hob so that it occupies the same position as it would occupy in mesh with said basic gear and rotating said hob in engagement with a tapered gear blank while rotating the blank continuously on its axis and simultaneously producing a relative generating movement between said hob and blank as if the blank were meshing with said basic gear.

8. The method of generating a straight tooth bevel gear conjugate to a straight tooth basic gear which consists in selecting a hob which will mesh with said basic gear along a line extending diagonally of the face of said basic gear positioning said hob so that it occupies the same position as it would occupy if in mesh with said basic gear and rotating said hob in engagement with a tapered gear blank while rotating the blank on its axis continuously and simultaneously producing a relative rolling movement between the hob and blank about an axis intersecting the axis of the blank as if the blank were meshing with said basic gear.

9. The method of generating a tapered gear conjugate to a straight tooth basic gear which consists in employing a taper hob which will mesh with said basic gear along a line extending diagonally of the face of said basic gear, positioning said hob so that it occupies the same position as it would occupy if in mesh with said basic gear, and rotating said hob in engagement with a tapered gear blank while rotating the blank on its axis continuously and simultaneously producing a relative generating movement between the hob and blank as if the blank were meshing with said basic gear.

10. The method of generating a straight tooth bevel gear conjugate to a basic crown gear which consists in employing a taper hob capable of meshing with said crown gear along a line extending diagonally of the face of said crown gear and offset from its axis, positioning said hob so that it occupies the same position as it would occupy if in mesh with said crown gear and rotating said hob in engagement with a tapered gear blank while rotating the blank on its axis continuously and simultaneously producing a relative generating movement between the hob and blank about an axis intersecting the axis of the blank as if the blank were meshing with said crown gear.

11. The method of generating a tapered gear conjugate to a straight tooth basic gear which consists in employing a hob which represents said basic gear, positioning said hob with its axis extending diagonally of the face of a tapered gear blank and rotating said hob in engagement with the blank while rotating the blank continuously on its axis and simultaneously producing a relative generating movement between hob and blank.

12. The method of producing a straight toothed tapered gear which consists in employing a hob formed by gashing and relieving a worm capable of meshing with said gear along a line extending diagonally of its face and offset from its apex, positioning the hob with its axis offset from the apex of the gear blank and extending diagonally of the face of the gear blank and rotating said hob in continuous engagement with the blank while rotating the blank continuosly on its axis.

13. The method of producing a straight toothed tapered gear which consists in employing a taper hob capable of meshing with said gear along a line extending diagonally of its face and offset from its apex, positioning the hob with its axis offset from the apex of the gear blank and extending diagonally of the face of the blank and rotating said hob in continuous engagement with the blank while rotating the blank continuously on its axis.

14. The method of producing straight teeth on tapered gear blanks which consists in selecting a hob having the general form of a worm whose threads have been gashed and relieved to provide cutting edges, positioning said hob with its axis extending diagonally of the face of a tapered gear blank and rotating the hob and blank continuously in intermeshing timed relation.

15. The method of producing straight teeth on tapered gear blanks which consists in selecting a taper hob having the general form of a taper worm whose threads have been gashed and relieved to provide cutting edges, positioning said hob with its axis extending diagonally of the face of a tapered gear blank and rotating the hob and blank continuously in intermeshing timed relation.

16. The method of producing straight teeth on tapered gear blanks which consists in selecting a hob having the general form of a worm whose threads have been gashed and relieved to provide cutting edges, positioning said hob with its axis extending diagonally of the face of a tapered gear blank and rotating the hob and blank continuously in intermeshing timed relation while simultaneously producing a relative rolling movement between the hob and blank.

17. The method of producing straight teeth on tapered gear blanks which consists in selecting a taper hob having the general form of a taper worm whose threads have been gashed and relieved to provide cutting edges, positioning said hob with its axis extending diagonally of the face of a taper gear blank and rotating the hob and blank continuously in intermeshing timed relation while simultaneously producing a relative rolling motion between the hob and blank.

B. E. SHLESINGER.